US010949998B2

(12) United States Patent
Liu

(10) Patent No.: US 10,949,998 B2
(45) Date of Patent: Mar. 16, 2021

(54) INDOOR SPACE POSITIONING BASED ON VORONOI DIAGRAM

(71) Applicant: BOE TECHNOLOGY GROUP CO., LTD., Beijing (CN)

(72) Inventor: Cheng Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 56 days.

(21) Appl. No.: 16/474,492

(22) PCT Filed: Jan. 16, 2019

(86) PCT No.: PCT/CN2019/071887
§ 371 (c)(1),
(2) Date: Jun. 27, 2019

(87) PCT Pub. No.: WO2019/141177
PCT Pub. Date: Jul. 25, 2019

(65) Prior Publication Data
US 2020/0357135 A1 Nov. 12, 2020

(30) Foreign Application Priority Data

Jan. 16, 2018 (CN) .......................... 201810039703.3

(51) Int. Cl.
*G06T 7/73* (2017.01)
(52) U.S. Cl.
CPC ...... *G06T 7/74* (2017.01); *G06T 2207/30244* (2013.01)
(58) Field of Classification Search
CPC ..... G06T 7/74; G06T 7/11; G06T 7/30; G06T 7/70; G06T 2207/30244;
(Continued)

(56) References Cited

U.S. PATENT DOCUMENTS 4,797,557 A 1/1989 Öhman
9,954,614 B2* 4/2018 Lee ........................ H05B 47/19
(Continued)

FOREIGN PATENT DOCUMENTS

CN 103929717 A 7/2014
CN 104048661 A 9/2014
(Continued)

OTHER PUBLICATIONS

First Office Action and English language translation, CN Application No. 201810039703.3, dated Dec. 12, 2019, 24 pp.
(Continued)

*Primary Examiner* — Michael S Osinski
(74) *Attorney, Agent, or Firm* — Myers Bigel, P.A.

(57) ABSTRACT

Embodiments of the disclosure provide an indoor positioning device, a movable device including the same, a method for positioning a movable device in an indoor space and a computer-readable medium. The indoor positioning device includes an imaging unit for capturing image information of at least one of a plurality of luminaires which are located at a top of the indoor space, a storage unit for storing information of a luminaire Voronoi diagram includes a plurality of Voronoi diagram units, each Voronoi diagram unit includes a generator which is located in a projection of a respective luminaire of the plurality of luminaires on a horizontal plane of the indoor space, and a processor for receiving the image information and the information of the luminaire Voronoi diagram, and calculate a position of the imaging unit in the indoor space based on the image information and the information of the luminaire Voronoi diagram.

20 Claims, 4 Drawing Sheets

(58) Field of Classification Search
CPC ........... G06T 2207/30232; G06T 15/04; G06T 15/506; G01S 5/16; G01S 5/163; G01S 5/0263; G01S 5/0258; G01S 5/0268; G01S 1/70; G01S 11/12; G06K 9/00771; G06K 9/2054; G06K 9/00221; G06K 9/00255; G06K 9/00335

See application file for complete search history.

(56) References Cited

U.S. PATENT DOCUMENTS

| | | | |
|---|---|---|---|
| 10,401,470 B2* | 9/2019 | Yang | G01S 13/74 |
| 10,412,544 B1* | 9/2019 | Zhang | H04W 4/021 |
| 10,593,026 B2* | 3/2020 | Ohga | G06T 3/0037 |
| 2012/0121161 A1 | 5/2012 | Eade et al. | |
| 2013/0026224 A1 | 1/2013 | Ganick et al. | |
| 2013/0141555 A1* | 6/2013 | Ganick | H04B 10/60 348/61 |
| 2014/0232866 A1* | 8/2014 | Lee | G01S 5/16 348/143 |
| 2015/0084853 A1* | 3/2015 | Li | G06F 3/03542 345/156 |
| 2015/0085078 A1* | 3/2015 | Li | G06T 7/571 348/46 |
| 2015/0119082 A1 | 4/2015 | Raman | |
| 2016/0025837 A1* | 1/2016 | Hillier | G01S 5/0036 342/386 |
| 2016/0139234 A1 | 5/2016 | Ganick et al. | |
| 2016/0154088 A1* | 6/2016 | Holtman | G01S 5/16 382/106 |
| 2016/0353083 A1* | 12/2016 | Aoki | G06T 7/521 |
| 2016/0353099 A1 | 12/2016 | Thomson et al. | |
| 2017/0085811 A1* | 3/2017 | Brain | H04N 5/341 |
| 2017/0094098 A1* | 3/2017 | Manda | H04N 1/6008 |
| 2017/0178360 A1* | 6/2017 | Baggen | G06F 1/1694 |
| 2017/0234693 A1* | 8/2017 | Bak | G01C 21/3679 701/300 |
| 2018/0088207 A1* | 3/2018 | Feil | H04B 10/116 |
| 2018/0144213 A1* | 5/2018 | Nieuwlands | G06T 7/74 |
| 2018/0167140 A1* | 6/2018 | Brandt-Pearce | H04B 10/1149 |
| 2018/0203448 A1* | 7/2018 | Kim | G05D 1/0238 |
| 2018/0211440 A1* | 7/2018 | Kunkel | G06T 19/006 |
| 2018/0259616 A1* | 9/2018 | Jo | G01S 17/36 |
| 2018/0300579 A1* | 10/2018 | Tojo | G06F 5/001 |
| 2019/0101377 A1* | 4/2019 | White | H04N 5/33 |
| 2019/0104972 A1* | 4/2019 | Takagi | A61B 5/1113 |
| 2019/0139260 A1* | 5/2019 | Miyamoto | G06T 7/73 |
| 2019/0156943 A1* | 5/2019 | Kocherscheidt | G16H 40/67 |
| 2019/0265722 A1* | 8/2019 | Haeusler | G05D 1/0272 |
| 2019/0304114 A1* | 10/2019 | Yoshimura | G06T 7/174 |
| 2019/0325087 A1* | 10/2019 | Parry | G06T 11/001 |
| 2020/0122344 A1* | 4/2020 | Lee | B25J 19/022 |
| 2020/0192553 A1* | 6/2020 | Van De Sluis | G06T 11/00 |

FOREIGN PATENT DOCUMENTS

| | | |
|---|---|---|
| CN | 105674986 A | 6/2016 |
| CN | 106197429 A | 12/2016 |
| CN | 106840140 A | 6/2017 |
| EP | 0 363 339 A2 | 4/1990 |
| WO | 2012/040644 A1 | 3/2012 |
| WO | 2016/079656 A1 | 5/2016 |

OTHER PUBLICATIONS

Yuan et al., "Algorithm of indoor location based on Voronoi graph and ray-tracing" (English language Abstract), Application Research of Computers, vol. 30, No. 2, Feb. 2013, 3 pp.

Masteral Dissertation—"A Distributed Voronoi-based Acoustic Source Localization Method with Wireless Sensor Networks" (English language abstract), Dalian University of Technology, Mar. 18, 2016, 64 pp.

* cited by examiner

INDOOR SPACE POSITIONING BASED ON VORONOI DIAGRAM

CROSS REFERENCE TO RELATED APPLICATIONS

The present application is a 35 U.S.C. 371 national stage application of PCT International Application No. PCT/CN2019/071887, filed on Jan. 16, 2019, which claims the priority benefits of the patent application No. 201810039703.3 filed to the Patent Office of China on Jan. 16, 2018, the disclosure of which is incorporated herein by reference.

TECHNICAL FIELD

This disclosure mainly relates to the field of positioning techniques, and in particular, to an indoor positioning device, a movable device comprising the same and a method for positioning a movable device in an indoor space.

BACKGROUND

At present, conventional indoor positioning techniques include visible light positioning and received signal strength (RSS)-based positioning. The visible light positioning usually requires that a lighting fixture should have a communication function for sending positional information or identifiers of the lighting fixture to a positioning device, so the lighting fixture is required to be equipped with a wireless communication device, or it is necessary to modify the lighting fixture such that it has a visible light communication capability that enables it to send specified identifiers based on changes in light emitting parameters (such as brightness, color and spectrum). Therefore, the visible light positioning based on light communication leads to a higher cost of the lighting fixture. The received signal strength (RSS)-based positioning involves transmission of electromagnetic waves or acoustic waves in an indoor space, but this method is subject to multipath effects, which is unfavorable to the improvement of positioning accuracy. Highly accurate positioning requires highly dense arrangement of signal sources, which also causes increase in the cost.

SUMMARY

An embodiment of the disclosure provides an indoor positioning device, comprising: an imaging unit configured to capture image information of at least one of a plurality of luminaires, the plurality of luminaires being located at a top of an indoor space; a storage unit configured to at least store information of a luminaire Voronoi diagram, the luminaire Voronoi diagram comprising a plurality of Voronoi diagram units, each Voronoi diagram unit of the plurality of Voronoi diagram units comprising a generator, the generator of each Voronoi diagram unit of the plurality of Voronoi diagram units being located in a projection of a respective luminaire of the plurality of luminaires on a horizontal plane of the indoor space, and a processor configured to receive the image information and the information of the luminaire Voronoi diagram, and calculate a position of the imaging unit in the indoor space based on the image information and the information of the luminaire Voronoi diagram.

In some embodiments, the imaging unit comprises a camera, the camera is configured such that an optical axis of the camera is perpendicular to the horizontal plane of the indoor space when the image information of the luminaires is being captured.

In some embodiments, the image information comprises image information of N luminaires, and the processor is configured to calculate reference coordinates of the imaging unit in a reference coordinate system based on information parameters of M luminaires among the N luminaires and a coordinate system angle, thereby obtaining M reference coordinates, the processor is further configured to calculate an average of the M reference coordinates as the position of the imagining unit in the indoor space, the reference coordinate system is defined based on the horizontal plane of the indoor space and has a fixed origin, the coordinate system angle is an angle enclosed between an x- or y-axis of the reference coordinate system and an x-axis of an imaging unit coordinate system, and an origin of the imaging unit coordinate system is located in the imaging unit, and a plane defined by the x-axis and a y-axis of the imaging unit coordinate system is parallel with the horizontal plane, the information parameters of each luminaire comprise a coordinate position of the luminaire in the reference coordinate system and a projection vector of a position vector of the luminaire on the horizontal plane, wherein a starting point of the position vector is the camera and an end point of the position vector is the luminaire. M and N are both integers greater than or equal to 1, and M is smaller than or equal to N.

In some embodiments, the indoor positioning device further comprises an inertial measurement unit, the inertial measurement unit is configured to acquire a measurement position and a rotation angle of the imaging unit in the horizontal plane of the indoor space, the rotation angle is an angle at which the imaging unit rotates relative to an initial state around the optical axis in the horizontal plane.

In some embodiments, the processor is configured to determine a position of the imaging unit in the luminaire Voronoi diagram according to the measurement position of the imaging unit, and select a reference luminaire according to the position of the imaging unit in the luminaire Voronoi diagram, and the processor is further configured to calculate coordinates of the imaging unit in the reference coordinate system as the position of the imaging unit in the indoor space based on information parameters of the reference luminaire and the rotation angle, the reference coordinate system is defined based on the horizontal plane of the indoor space and has a fixed origin, the information parameters of the reference luminaire comprise a coordinate position of the reference luminaire in the reference coordinate system and a projection vector of a reference position vector of the reference luminaire on the horizontal plane, a starting point of the reference position vector is the camera and an end point of the reference position vector is the reference luminaire.

In some embodiments, the processor is configured to choose, in response to the measurement position of the imaging unit being located in a first Voronoi diagram unit of the luminaire Voronoi diagram, a first luminaire corresponding to the first Voronoi diagram unit as the reference luminaire, the information parameters of the reference luminaire comprise a first coordinate position of the first luminaire in the reference coordinate system and a first projection vector of a first position vector of the first luminaire on the horizontal plane, wherein an starting point of the first position vector is the camera and an end point of the first position vector is the first luminaire.

In some embodiments, the processor is configured to choose, in response to the measurement position of the imaging unit being located on a junction between a first Voronoi diagram unit and a second Voronoi diagram unit of the luminaire Voronoi diagram, a first luminaire corresponding to the first Voronoi diagram unit and a second luminaire corresponding to the second Voronoi diagram unit as reference luminaires, calculate a first position and a second position of the imaging unit in the reference coordinate system respectively based on information parameters of the first luminaire, information parameters of the second luminaire and the rotation angle, and calculate an average of the first position and the second position as the position of the imaging unit in the indoor space.

In some embodiments, the processor is configured to choose, in response to the measurement position of the imaging unit being located at an intersection of a first Voronoi diagram unit, a second Voronoi diagram unit and a third Voronoi diagram unit of the luminaire Voronoi diagram, a first luminaire corresponding to the first Voronoi diagram unit, a second luminaire corresponding to the second Voronoi diagram unit and a third luminaire corresponding to the third Voronoi diagram unit as reference luminaires, calculate a first position, a second position and a third position of the imaging unit in the reference coordinate system respectively based on information parameters of the first luminaire, information parameters of the second luminaire, information parameters of the third luminaire and the rotation angle, and calculate an average of the first position, the second position and the third position as the position of the imaging unit in the indoor space.

In some embodiments, the indoor positioning device further comprises a communication unit configured to receive information of an updated luminaire Voronoi diagram, the information of the updated luminaire Voronoi diagram reflecting supplement, failure and absence of luminaires at the top of the indoor space.

In some embodiments, the inertial measurement unit at least comprises an acceleration sensor and a three-axis angular velocity sensor.

In some embodiments, the luminaire Voronoi diagram comprises a weighted Voronoi diagram, and a difference between a vertical distance from the luminaires to a ground of the indoor space and a vertical distance from the imaging unit to the ground of the indoor space serves as a weight for the weighted Voronoi diagram.

In some embodiments, the processor is further configured to reversely calculate a first value and a second value for the rotation angle respectively based on the first position and second position, and replace the rotation angle obtained based on the inertial measurement unit with an average of the first value and the second value.

In some embodiments, the processor is further configured to reversely calculate a first value, a second value and a third value for the rotation angle respectively based on the first position, second position and third position, and replace the rotation angle obtained based on the inertial measurement unit with an average of the first value, the second value and the third value.

In some embodiments, the generator of each Voronoi diagram unit of the plurality of Voronoi diagram units comprises a projection of a central point of a light-emitting portion of the respective luminaire of the plurality of luminaires on the horizontal plane of the indoor space.

Another embodiment of the disclosure provides a movable device comprising the indoor positioning device according to any one of foregoing embodiments.

In some embodiments, the movable device comprises a shopping trolley.

Yet another embodiment of the disclosure provides a method for positioning a movable device in an indoor space, the movable device comprising an imaging unit, the method comprising: capturing, by the imaging unit, image information of at least one of a plurality of luminaires, the plurality of luminaires being located at a top of the indoor space; acquiring information of a luminaire Voronoi diagram, the luminaire Voronoi diagram comprising a plurality of Voronoi diagram units, each Voronoi diagram unit of the plurality of Voronoi diagram units comprising a generator, the generator of each Voronoi diagram unit of the plurality of Voronoi diagram units being located in a projection of a respective luminaire of the plurality of luminaires on a horizontal plane, and calculating a position of the imaging unit in the indoor space based on the image information and the information of the luminaire Voronoi diagram.

In some embodiments, the method further comprises: acquiring, by an inertial measurement unit, a measurement position and a rotation angle of the imaging unit in the horizontal plane of the indoor space, the rotation angle being an angle at which the imaging unit rotates relative to an initial state around an optical axis of the imaging unit in the horizontal plane; determining a position of the imaging unit in the luminaire Voronoi diagram based on the measurement position, and selecting a reference luminaire according to the position of the imaging unit in the luminaire Voronoi diagram, and calculating the position of the imaging unit in the indoor space based on information parameters of the reference luminaire and the rotation angle. The information parameters of the reference luminaire comprise a reference coordinate position of the reference luminaire in the reference coordinate system and a projection vector of a reference position vector of the reference luminaire on the horizontal plane, a starting point of the reference position vector is the imaging unit and an end point of the reference position vector is the reference luminaire, and wherein the reference coordinate system is defined based on the horizontal plane of the indoor space and has a fixed origin.

In some embodiments, the method further comprises: in response to the measurement position of the imaging unit being located in a first Voronoi diagram unit of the luminaire Voronoi diagram, choosing a first luminaire corresponding to the first Voronoi diagram unit as the reference luminaire, the information parameters of the reference luminaire comprising a first coordinate position of the first luminaire in the reference coordinate system and a first projection vector of a first position vector of the first luminaire on the horizontal plane, wherein a starting point of the first position vector is the imaging unit and an end point of the first position vector is the first luminaire; in response to the measurement position of the imaging unit being located on a junction between a first Voronoi diagram unit and a second Voronoi diagram unit of the luminaire Voronoi diagram, choosing a first luminaire corresponding to the first Voronoi diagram unit and a second luminaire corresponding to the second Voronoi diagram unit as reference luminaires, calculating a first position and a second position of the imaging unit in the reference coordinate system respectively based on information parameters of the first luminaire, information parameters of the second luminaire and the rotation angle, and calculating an average of the first position and the second position as the position of the imaging unit in the indoor space; and in response to the measurement position of the imaging unit being located at an intersection of a first Voronoi diagram unit, a second Voronoi diagram unit and a third Voronoi diagram unit of the luminaire Voronoi diagram, choosing a first luminaire corresponding to the first Voronoi diagram unit, a second luminaire corresponding to the second Voronoi diagram unit and a third luminaire corresponding to the third Voronoi diagram unit as reference luminaires, calculating a first position, a second position and a third position of the imaging unit in the reference coordinate system respectively based on information parameters of the first luminaire, information parameters of the second luminaire, information parameters of the third luminaire and the rotation angle, and calculating an average of the first position, the second position and the third position as the position of the imaging unit in the indoor space.

In some embodiments, the method further comprises: reversely calculating a first value, a second value and a third value for the rotation angle respectively based on the first position, second position and third position, and replacing the rotation angle obtained based on the inertial measurement unit with an average of the first value, the second value and the third value.

Still another embodiment of the disclosure provides a computer readable medium on which a program is stored, the program being configured to execute the method according to any of the foregoing embodiments 17-20 when running on a computer or a processor.

For one skilled in the art, it can be understood that features of the above embodiments can be combined in various manners to form additional different further embodiments.

DETAILED DESCRIPTION OF EMBODIMENTS

Next, some embodiments of this disclosure will be described in detail with reference to the drawings by way of example. One skilled in the art can understand that the embodiments described below are only part of possible embodiments based on the inventive concept revealed herein, rather than all of them. With the guidance of the technical concept disclosed herein, other embodiments including obvious modifications or variations to the embodiments provided herein also fall within the protection scope of the present application.

Figure 1:
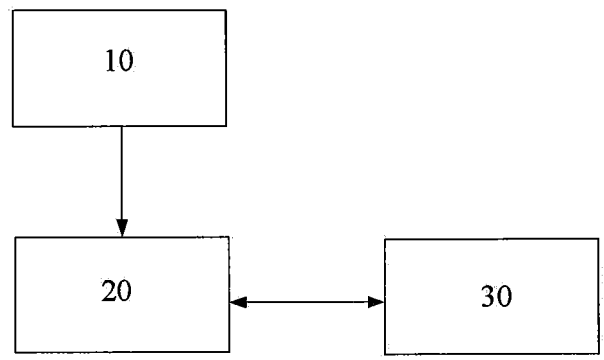
FIG. 1 schematically shows a structure view of an indoor positioning device according to an embodiment of this disclosure.

FIG. 1 schematically shows a structure view of an indoor positioning device according to an embodiment of this disclosure. The indoor positioning device comprises an imaging unit 10 for capturing image information of at least one of a plurality of luminaires, the plurality of luminaires being located at the top of an indoor space; a storage unit 30 at least for storing information of a luminaire Voronoi diagram, the luminaire Voronoi diagram comprising a plurality of Voronoi diagram units, each Voronoi diagram unit comprising a generator, each generator of the plurality of Voronoi diagram units being located in a projection of a respective luminaire of the plurality of luminaires on a horizontal plane of the indoor space; and a processor 20 for receiving the image information and the information of the luminaire Voronoi diagram, and calculating a position of the imaging unit in the indoor space based on the image information and the information of the luminaire Voronoi diagram.

The concept of Voronoi diagram is well known for those skilled in the art, and the luminaire Voronoi diagram can be drawn after the positions of all luminaires located at the top of the indoor space are calibrated in the horizontal plane. The Voronoi diagram comprises a plurality of regions which are called Voronoi diagram units, each of which is corresponding to a generator. Therefore, in the luminaire Voronoi diagram, each point in each Voronoi diagram unit is less distant to the generator of the Voronoi diagram unit than to the generators of other Voronoi diagram units. As mentioned above, the generators of the plurality of Voronoi diagram units are located in respective projections of the plurality of luminaires on the horizontal plane of the indoor space, i.e., each of the generators of the plurality of Voronoi diagram units can be determined as any point within the respective projections of the plurality of luminaires on the horizontal plane of the indoor space. In the depictions below, the principle of this disclosure will be illustrated by taking an example where projections of the central points of the light emitting portions of the plurality of luminaires located at the top of the indoor space on the horizontal plane of the indoor space are determined as generators of the luminaire Voronoi diagram.

The processor 20 may receive from the imaging unit 10 the image information of the luminaires captured thereby, and read from the storage unit 30 the information of the luminaire Voronoi diagram and calculate the position of the imaging unit in the indoor space based on these information. Accordingly, the position of a further device to which the indoor positioning device is attached can be obtained, i.e., the position of the imaging unit can be determined as the position of the further device to which the indoor positioning device is attached in the indoor space. For example, a reference coordinate system which has a fixed origin can be established based on the horizontal plane of the indoor space. Meanwhile, an imaging unit coordinate system can be established based on the imaging unit itself, the origin of the imaging unit coordinate system is located at the imaging unit and it varies with the movement of the imaging unit in the indoor space, i.e., the imaging unit coordinate system is a dynamic coordinate system varying with the movement of the imaging unit. Besides, from the luminaire Voronoi diagram, those skilled in the art can learn a general position of the imaging unit on the luminaire Voronoi diagram, and on this basis, a corresponding luminaire may be chosen as a reference luminaire for calculating the position of the imaging unit in the indoor space. Based on the position of the image of the reference luminaire in the image captured by the imaging unit, the direction of the reference luminaire with respect to the imaging unit can be determined. Based on this, the coordinate position of the reference luminaire in the imaging unit coordinate system can be obtained. Further, the coordinate position of the reference luminaire in the imaging unit coordinate system can be transformed into a position in the reference coordinate system, and then the position of the imaging unit in the reference coordinate system, i.e., the position of the imaging unit in the indoor space, can be calculated based on the coordinate position of the reference luminaire in the reference coordinate system.

Therefore, with the indoor positioning device provided in the embodiment of this disclosure, wireless communication or visible light communication is not required, and thus no light communication function or wireless communication function is required for the luminaires, which leads to stronger versatility and a lower application cost. Besides, since no transmission of electromagnetic signals or acoustic signals is involved, the multipath effects are reduced or eliminated.

The indoor positioning device provided in the embodiment of this disclosure can be mounted or fixed on any movable device in the indoor space, e.g., it can be mounted on a shopping trolley used in a supermarket, thereby positioning the shopping trolley.

According to an embodiment of this disclosure, the imaging unit 10 comprises a camera, the camera is configured such that when the image information of the luminaires is being captured, an optical axis of the camera is perpendicular to a horizontal plane of the indoor space, which may facilitate calculation of the position of the imaging unit.

Figure 2:
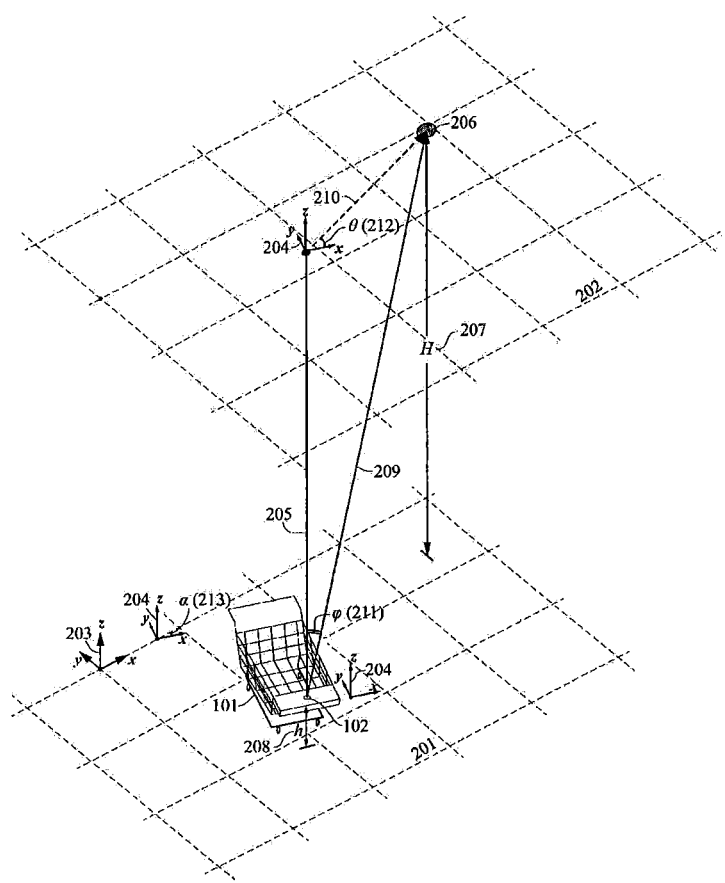
FIG. 2 schematically explains the principle of calculating a position of the indoor positioning device according to an embodiment of this disclosure.

The principle of calculating the position of the imaging unit in the indoor space will be explained below in detail by means of a specific example. In the example below, the indoor positioning device is fixed on a shopping trolley. The shopping trolley as shown in FIG. 2 comprises an indoor positioning device comprising an imaging unit 102. The shopping trolley is located on a horizontal ground 201, and the indoor space comprises luminaires mounted on a ceiling 202. When the shopping trolley smoothly moves on the horizontal ground, a height of the imaging unit 102 with respect to the ground is unchanged, and the optical axis thereof is in a vertical direction, i.e., substantially perpendicular to the horizontal plane of the indoor space. A reference coordinate system 203 is defined based on the horizontal ground plane, and the reference coordinate system can describe the indoor space in which the shopping trolley is located. The origin of the reference coordinate system 203 is located on the ground 201, and the z-axis thereof is in the vertical direction. A position of the shopping trolley (imaging unit) can be described in the reference coordinate system 203. Since the indoor positioning device comprising the imaging unit is fixed on the shopping trolley, the aforementioned imaging unit coordinate system can also be regarded as a shopping trolley coordinate system 204. The shopping trolley coordinate system 204 is a coordinate system moves with the shopping trolley, and in this example, the origin of the shopping trolley coordinate system 204 is selected to be located at the imaging unit 102, and the z-axis thereof is in the vertical direction and coincides with the optical axis of the imaging unit 102. Coordinates of non-movable parts of the shopping trolley in the shopping trolley coordinate system 204 do not vary with the movement of the shopping trolley. The z-axis 205 of the shopping trolley coordinate system in FIG. 2 is namely the optical axis of the imaging unit 102. A luminaire 206 is mounted or hung onto the ceiling 202, and a distance from the central point of the light-emitting portion of the luminaire to the ground 201 is H (207). A height of the imaging unit 102 from the ground 201 is h (208). A position vector $\bar{r}$ (209) is a position vector for the luminaire 206, and its starting point is the imaging unit (i.e., the origin of the shopping trolley coordinate system 204), and its end point is the central point of the light-emitting portion of the luminaire 206. A projection vector $\bar{r}_H$ (210) is a projection of the position vector $\bar{r}$ (209) on the horizontal plane. Angle φ (211) is an angle enclosed between the position vector $\bar{r}$ (209) and the optical axis 205. An angle θ (212) is an angle enclosed between the projection vector $\bar{r}_H$ (210) and the x-axis of the shopping trolley coordinate system 204. An angle α (213) is an angle enclosed between the x-axis of the shopping trolley coordinate system 204 and the x-axis of the reference coordinate system 203.

The aforementioned parameters such as the height H (207) and the height h (208) can be obtained by measurement. Optical parameters of the imaging unit 102 and parameters of image sensors thereof are known in advance or can be read at any time. It is a technique well-known for those skilled in the art to calculate a direction of an object with respect to a camera lens based on a position of an image of the object on the captured image comprising the image of the object. Those skilled in the art can calculate the angle φ (211) and the angle θ (212) by detecting the position of the light-emitting portion of the luminaire 206 in the image captured by the imaging unit 102. Therefore, the coordinates $(r_x, r_y, r_z)$ of the position vector $\bar{r}$ (209) in the shopping trolley coordinate system 204 can be expressed as:

$$(r_x, r_y, r_z) = (\tan \varphi \cos \theta, \tan \varphi \sin \theta, 1) \cdot |H-h|$$

The coordinates $(r_{Hx}, r_{Hy}, 0)$ of the projection vector $\bar{r}_H$ (210) in the shopping trolley coordinate system can be expressed as:

$$(r_{Hx}, r_{Hy}, 0) = (\tan \varphi \cos \theta, \tan \varphi \sin \theta, 1) \cdot |H-h|$$

The coordinates $(x_0, y_0)$ of the central point of the light-emitting portion of the luminaire 206 on the horizontal plane of the reference coordinate system 203 can be obtained by measurement in advance. By means of the principle of coordinate transformation, the coordinate $(r_{Hx}, r_{Hy}, 0)$ of the projection vector $\bar{r}_H$ (210) in the shopping trolley coordinate system can be transformed into coordinates in the reference coordinate system, thereby obtaining the coordinates of the projection vector $\bar{r}_H$ (210) in the horizontal plane of the reference coordinate system 203. Accordingly, the coordinates of the imaging unit 102 on the horizontal plane of the reference coordinate system 203 can be expressed as a difference between the coordinates $(x_0, y_0)$ of the central point of the light-emitting portion of the luminaire 206 on the horizontal plane of the reference coordinate system 203 and the coordinates of the projection vector $\bar{r}_H$ (210) on the horizontal plane of the reference coordinate system 203.

Based on the reference coordinate system 203 and the shopping trolley coordinate system 204 shown in FIG. 2, those skilled in the art can understand that the coordinates $(x_0, y_0)$ of the imaging unit 102 on the horizontal plane of the reference coordinate system 203 can be expressed as:

$$(x_{102}, y_{102}) = (x_0, y_0) - (r_{Hx}, r_{Hy}) \cdot \begin{bmatrix} \cos\alpha & \sin\alpha \\ -\sin\alpha & \cos\alpha \end{bmatrix}$$

What is illustrated above is an example of calculating the coordinate position of the imaging unit (shopping trolley) in the reference coordinate system based on one reference luminaire, in some embodiments, the coordinate position of the imaging unit (shopping trolley) in the reference coordinate system can be calculated based on more than one reference luminaires. For example, if there are images of N luminaires (N is an integer greater than 1) in the image captured by the imaging unit 102, the horizontal coordinates of the luminaires in the reference coordinate system 203 are respectively $(x_0,y_0)_k$, k=1, 2, . . . , N, N values $(x_{102},y_{102})_k$, k=1, 2, . . . , N about the horizontal coordinates of the imaging unit 102 in the reference coordinate system will be calculated according to the principle described based on FIG. 2. Based on the N values, an average coordinate value $(x_{102},y_{102})_m$ can be calculated as the horizontal coordinates $(x_{102},y_{102})$ of the imaging unit 102 in the reference coordinate system 203 and as the position of the imaging unit. The above average coordinate value $(x_{102},y_{102})_m$ can be obtained based on any suitable method known by those skilled in the art for calculating an average, e.g., vector average method, weighted average method, circle average method, least square method and so on. Of course, images of part of the luminaires can be selected from the images of the N luminaires in the image captured by the imaging unit 102 as reference luminaires for calculating an average coordinate position of the imaging unit (shopping trolley) in the reference coordinate system.

To sum up, in the embodiments of this disclosure, for an case in which the image information captured by the imaging unit comprises image information of N luminaires, the processor 20 can be configured to calculate reference coordinates of the imaging unit in the reference coordinate system based on information parameters of M luminaires among the N luminaires and a coordinate system angle, thereby obtaining M reference coordinates, and the processor 20 is further configured to calculate an average of the M reference coordinates as a position of the imaging unit in the indoor space. The coordinate system angle refers to an angle enclosed between the x- or y-axis of the reference coordinate system and the x-axis of an imaging unit coordinate system (e.g., angle α in FIG. 2), and the origin of the imaging unit coordinate system is located in the imaging unit, and a plane defined by the x-axis and the y-axis of the imaging unit coordinate system is parallel with the horizontal plane. The information parameter of each luminaire comprises a coordinate position of the central point of the light-emitting portion of the luminaire in the reference coordinate system and a projection vector of a position vector of the luminaire on the horizontal plane, and the starting point of the position vector is the camera and the end point thereof is the central point of the light-emitting portion of the luminaire. M and N are both integers greater than or equal to 1, and M is smaller than or equal to N.

Figure 3:
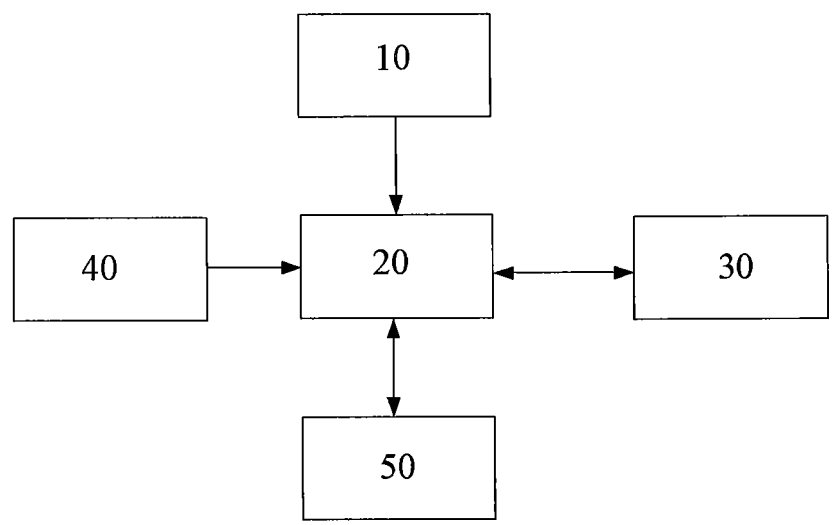
FIG. 3 schematically shows a structure view of the indoor positioning device according to another embodiment of this disclosure.

It can be appreciated that the coordinate system angle can be obtained by means of any suitable measuring instrument or by using any suitable method. For example, in some embodiments, as shown in FIG. 3, the indoor positioning device can further comprise an inertial measurement unit 40 (an inertial sensor), with the inertial measurement unit 40, a measurement position (which can be regarded as a general position of the imaging unit) and a rotation angle of the imaging unit in the horizontal plane of the indoor space can be acquired, the rotation angle being an angle at which the imaging unit rotates around the optical axis thereof relative to an initial state in the horizontal plane. The coordinate system angle can be obtained based on the rotation angle and the initial position parameters of the imaging unit coordinate system. In some embodiments, the inertial measurement unit can comprise an acceleration sensor and a three-axis angular velocity sensor. Furthermore, the inertial measurement unit can also comprise a three-axis magnetic field sensor for improving accuracy of the measurement.

Figure 4:
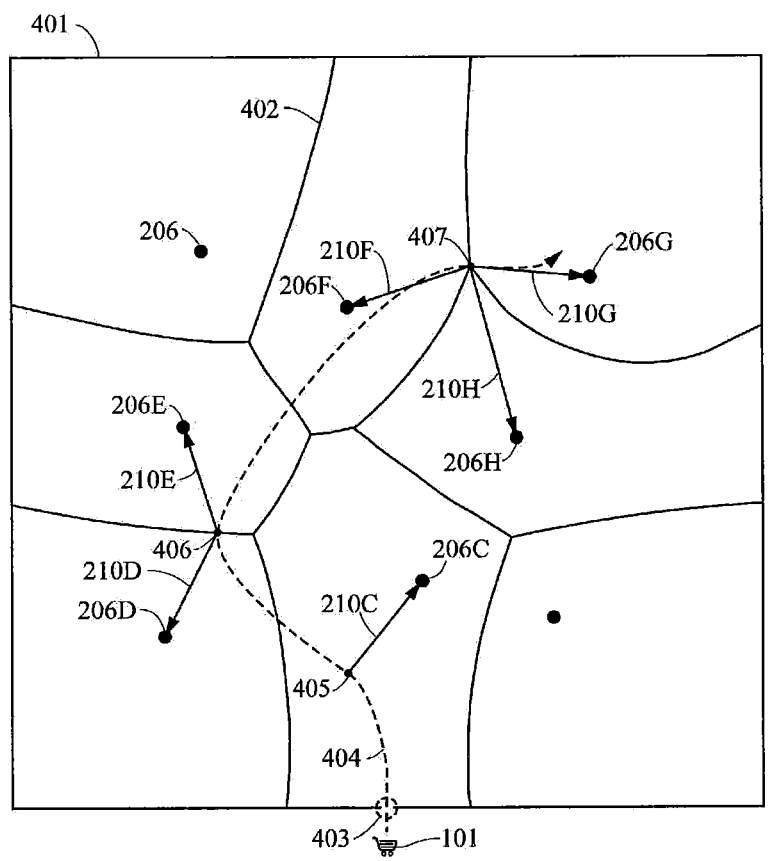
FIG. 4 schematically shows an example of a luminaire Voronoi diagram according to an embodiment of this disclosure.

FIG. 4 schematically shows an example of the luminaire Voronoi diagram, and the indoor positioning device (or a movable device comprising the indoor positioning device) may determine a corresponding position of the imaging unit in the luminaire Voronoi diagram based on the measured position of the imaging unit in the horizontal plane of the indoor space. In some embodiments, the processor 20 may be configured to determine a position of the imaging unit in the luminaire Voronoi diagram according to the measurement position of the imaging unit, and select a reference luminaire according to the position of the imaging unit in the luminaire Voronoi diagram, and the processor 20 is further configured to calculate a position of the imaging unit in the reference coordinate system based on information parameters of the reference luminaire and the rotation angle. The information parameters of the reference luminaire comprise a reference coordinate position of the central point of the light-emitting portion of the reference luminaire in the reference coordinate system and a projection vector of a reference position vector of the reference luminaire on the horizontal plane, and the starting point of the reference position vector is the imaging unit and the end point thereof is the central point of the light-emitting portion of the reference luminaire.

For example, the processor 20 is configured to choose, in response to the measurement position of the imaging unit being located in a first Voronoi diagram unit of the luminaire Voronoi diagram, a first luminaire corresponding to the first Voronoi diagram unit as a reference luminaire. In this case, the information parameters of the reference luminaire comprise a first coordinate position of the central point of the light-emitting portion of the first luminaire in the reference coordinate system and a projection vector of a first position vector of the first luminaire on the horizontal plane, and the starting point of the first position vector is the imaging unit and the end point of the first position vector is the central point of the light-emitting portion of the first luminaire. For example, as shown in FIG. 4, when the measurement position of the imaging unit corresponds to a point 405 in FIG. 4, a first position of the imaging unit in the reference coordinate system can be calculated as the position of the imaging unit in the indoor space based on the information parameters of the first luminaire corresponding to the first Voronoi diagram unit in which a generator 206C is located and the rotation angle, the generator 206C being a projection of the central point of the light-emitting portion of the first luminaire on the horizontal plane. The information parameters of the first luminaire comprise a first coordinate position of the central point of the light-emitting portion of the first luminaire in the reference coordinate system and a projection vector 210C of a first position vector of the first luminaire on the horizontal plane, and the starting point of the first position vector is the camera and the end point thereof is the central point of the light-emitting portion of the first luminaire. In this case, the principle of calculating the position of the imaging unit is the same as the principle discussed above with reference to FIG. 2.

Alternatively, in some embodiments, the processor can be configured to choose, in response to the measurement position of the imaging unit being located on a junction between a first Voronoi diagram unit and a second Voronoi diagram unit of the luminaire Voronoi diagram, a first luminaire corresponding to the first Voronoi diagram unit and a second luminaire corresponding to the second Voronoi diagram unit as reference luminaires, calculate a first position and a second position of the imaging unit in the reference coordinate system respectively based on information parameters of the first luminaire corresponding to the first Voronoi diagram unit, information parameters of the second luminaire corresponding to the second Voronoi diagram unit and the rotation angle, and calculate an average of the first position and the second position as a position of the imaging unit in the indoor space. For example, in an example, the measurement position of the imaging unit is located at a point 406 shown in FIG. 4, the point 406 is located on a junction between a first Voronoi diagram unit in which a generator 206D is located and a second Voronoi diagram unit in which a generator 206E is located, the generator 206D and the generator 206E being respectively projections of the central points of the light-emitting portions of the first and second luminaires on the horizontal plane. In this case, a first position and a second position of the imaging unit in the reference coordinate system can be calculated respectively based on information parameters of the first luminaire corresponding to the first Voronoi diagram unit in which the generator 206D is located, information parameters of the second luminaire corresponding to the second Voronoi diagram unit in which the generator 206E is located and the rotation angle, and an average of the first position and the second position can be calculated as a position of the imaging unit in the indoor space. The information parameters of the first luminaire comprise a first coordinate position of the central point of the light-emitting portion of the first luminaire in the reference coordinate system and a projection vector 210D of a first position vector of the first luminaire on the horizontal plane, and the starting point of the first position vector is the camera and the end point thereof is the central point of the light-emitting portion of the first luminaire. The information parameters of the second luminaire comprise a second coordinate position of the central point of the light-emitting portion of the second luminaire in the reference coordinate system and a projection vector 210E of a second position vector of the second luminaire on the horizontal plane, and the starting point of the second position vector is the camera and the end point thereof is the central point of the light-emitting portion of the second luminaire. In this case, the principle of calculating the position of the imaging unit can be the same as the principle discussed above with reference to FIG. 2.

In a further embodiment, the processor can be configured to choose, in response to the measurement position of the imaging unit being located at an intersection of a first Voronoi diagram unit, a second Voronoi diagram unit and a third Voronoi diagram unit of the luminaire Voronoi diagram, a first luminaire corresponding to the first Voronoi diagram unit, a second luminaire corresponding to the second Voronoi diagram unit and a third luminaire corresponding to the third Voronoi diagram unit as reference luminaires, calculate a first position, a second position and a third position of the imaging unit in the reference coordinate system respectively based on information parameters of the first luminaire corresponding to the first Voronoi diagram unit, information parameters of the second luminaire corresponding to the second Voronoi diagram unit, information parameters of the third luminaire corresponding to the third Voronoi diagram unit and the rotation angle, and calculate an average of the first position, the second position and the third position as a position of the imaging unit in the indoor space. For example, if the measurement position of the imaging unit is located at a point 407 in the luminaire Voronoi diagram shown in FIG. 4, a first position, a second position and a third position of the imaging unit in the reference coordinate system can be calculated respectively based on information parameters of the first luminaire corresponding to the first Voronoi diagram unit in which a generator 206F is located, information parameters of the second luminaire corresponding to the second Voronoi diagram unit in which a generator 206G is located, information parameters of the third luminaire corresponding to the third Voronoi diagram unit in which a generator 206H is located and the rotation angle, and an average of the first position, the second position and the third position can be calculated as a position of the imaging unit in the indoor space. The generators 206F, 206G and 206H are respectively projections of the central points of the light-emitting portions of the first luminaire, the second luminaire and the third luminaire on the horizontal plane. The information parameters of the first luminaire comprise a first coordinate position of the central point of the light-emitting portion of the first luminaire in the reference coordinate system and a projection vector 210F of a first position vector of the first luminaire on the horizontal plane, the starting point of the first position vector is the camera and the end point thereof is the central point of the light-emitting portion of the first luminaire. The information parameters of the second luminaire comprise a second coordinate position of the central point of the light-emitting portion of the second luminaire in the reference coordinate system and a projection vector 210G of a second position vector of the second luminaire on the horizontal plane, the starting point of the second position vector is the camera and the end point thereof is the central point of the light-emitting portion of the second luminaire. The information parameters of the third luminaire comprise a third coordinate position of the central point of the light-emitting portion of the third luminaire in the reference coordinate system and a projection vector 210H of a third position vector of the third luminaire on the horizontal plane, the starting point of the third position vector is the camera and the end point thereof is the central point of the light-emitting portion of the third luminaire. In this case, the principle of calculating the position of the imaging unit can be the same as the principle discussed above with reference to FIG. 2.

It can be understood that the processor 20 discussed above can be implemented in various ways, for example it can be in the forms of software and/or hardware and/or firmware, so as to execute various functions as required.

Referring again to FIG. 3, in a further embodiment, the indoor positioning device further comprises a communication unit 50, and the communication unit 50 is at least configured to receive information of an updated luminaire Voronoi diagram, the information of the updated luminaire Voronoi diagram reflecting supplement, failure and absence of luminaires at the top of the indoor space. The received updated luminaire Voronoi diagram can be stored in the storage unit 30. Therefore, in this embodiment, the luminaire Voronoi diagram can be updated timely according to the actual operation conditions of the luminaires in the indoor space, thus the positioning function of the indoor positioning device will not be affected in case of supplement, failure and absence of luminaires.

According to some embodiments of this disclosure, the luminaire Voronoi diagram is a weighted Voronoi diagram, and a difference between a vertical distance from the central point of the light-emitting portion of the luminaire to the ground of the indoor space and a vertical distance from the imaging unit to the ground of the indoor space serves as a weight of the weighted Voronoi diagram. The weight of the weighted Voronoi diagram in the embodiments of this disclosure will be explained with reference to FIG. 5, where the explanations are still given by taking a shopping trolley equipped with an indoor positioning device as an example.

Figure 5:
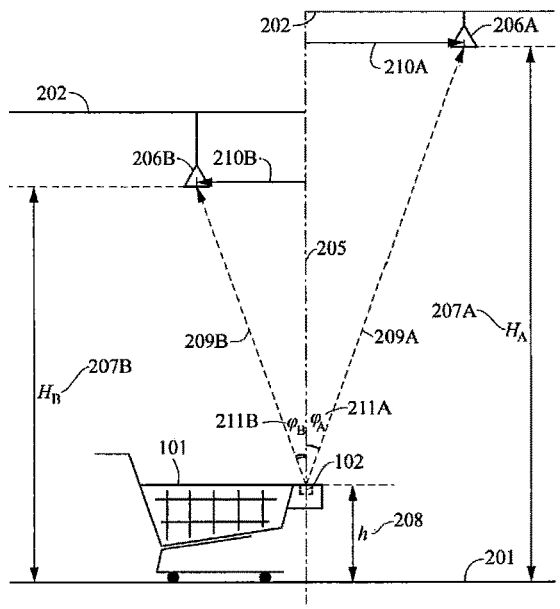
FIG. 5 schematically explains position vectors with respect to different luminaires.

In FIG. 5, the ground 201 is a horizontal plane, and luminaires 206A and 206B on the ceiling 202 have different heights from the ground 201. The heights of the central points of the light-emitting portions of the luminaires 206A and 206B from the ground are respectively $H_A$ (207A) and $H_B$ (207B), the position vectors of the central points of the light-emitting portions are respectively position vectors $\overline{r_A}$ (209A) and $\overline{r_B}$ (209B). The angles enclosed between the position vectors $\overline{r_A}$ (209A) and $\overline{r_B}$ (209B) and the optical axis of the imaging unit are angle $\varphi_A$ (211A) and angle $\varphi_B$ (211B), and the projection vectors of the position vectors $\overline{r_A}$ (209A) and $\overline{r_B}$ (209B) are respectively projection vectors $\overline{r_{HA}}$ (210A) and $\overline{r_{HB}}$ (210B). To facilitate illustration, in FIG. 5, the position vectors $\overline{r_A}$ (209A) and $\overline{r_B}$ (209B) and their respective associations are rotated and then drawn in a same plane.

In the image captured by the imaging unit 102, the position of the central point of the light-emitting portion of the luminaire only depends on the angle φ (211) and the angle θ (212), and the height of the luminaire from the ground only influences the size and the definition of the captured image. The angle of view of the imaging unit 102 is limited, and the larger the angle of view is, the severer the image distortion at the edge of the viewing angle range is, so in an example, choosing a luminaire that makes the angle φ (211) minimum as a reference luminaire can mitigate the image distortion to the maximum degree. As shown in FIG. 5, if the angle $\varphi_A$ (211A) and the angle $\varphi_B$ (211B) are equal, a ratio of magnitudes of the projection vectors $\overline{r_{HA}}$ (210A) and $\overline{r_{HB}}$ (210B) is:

$$\frac{r_{H_A}}{r_{H_B}} = \frac{(H_A - h)\tan\varphi_A}{(H_B - h)\tan\varphi_B} = \frac{H_A - h}{H_B - h}$$

Therefore, for the same angle φ (211), the projection vector $\overline{r_H}$ (210) has a value proportional to the height of the luminaire relative to the imaging unit. Therefore, in some embodiments of this disclosure, a difference between a vertical distance from the central point of the light-emitting portion of the luminaire to the ground of the indoor space and a vertical distance from the imaging unit to the ground of the indoor space serves as a weight of the weighted Voronoi diagram. In this way, the luminaire (the reference luminaire) to be observed by the imaging unit could be as close to the optical axis of the imaging unit as possible, which may decrease the requirements for the view angle of the camera and reduce the observation errors.

In a further embodiment of the disclosure, in a case in which a plurality of luminaires are used as reference luminaires, the processor 20 is further configured to reversely calculate a plurality of angle values for the rotation angle respectively based on the calculated plurality of positions (e.g., the first position, the second position and the third position mentioned above) of the imaging unit in the reference coordinate system, and replace the rotation angle acquired with the inertial measurement unit with an average of the plurality of angle values. Accordingly, the inertial measurement unit can be corrected, thereby reducing or eliminating the accumulated errors of the inertial measurement, which helps to improve the accuracy of the navigation positioning of the inertial measurement unit.

Therefore, in some embodiments, based on a first value and a second value that have been calculated, the processor 20 replaces the rotation angle obtained based on the inertial measurement unit with an average of the first value and the second value. In a further embodiment, the processor 20 is configured to reversely calculate a first value, a second value and a third value for the rotation angle respectively based on the calculated first position, second position or third position, and replace the rotation angle obtained based on the inertial measurement unit with an average of the first value, the second value and the third value.

It can be understood that the indoor positioning device provided in the embodiment of this disclosure is not limited to applying to a shopping trolley in a supermarket, but instead, it can be applied to any movable device in an indoor space. Therefore, another embodiment of this disclosure provides a movable device, which comprises the indoor positioning device described in any of the above embodiments.

The process of positioning a shopping trolley in an indoor space will be exemplified below by a shopping trolley comprising an indoor positioning device provided in the embodiments of this disclosure.

Figure 6:
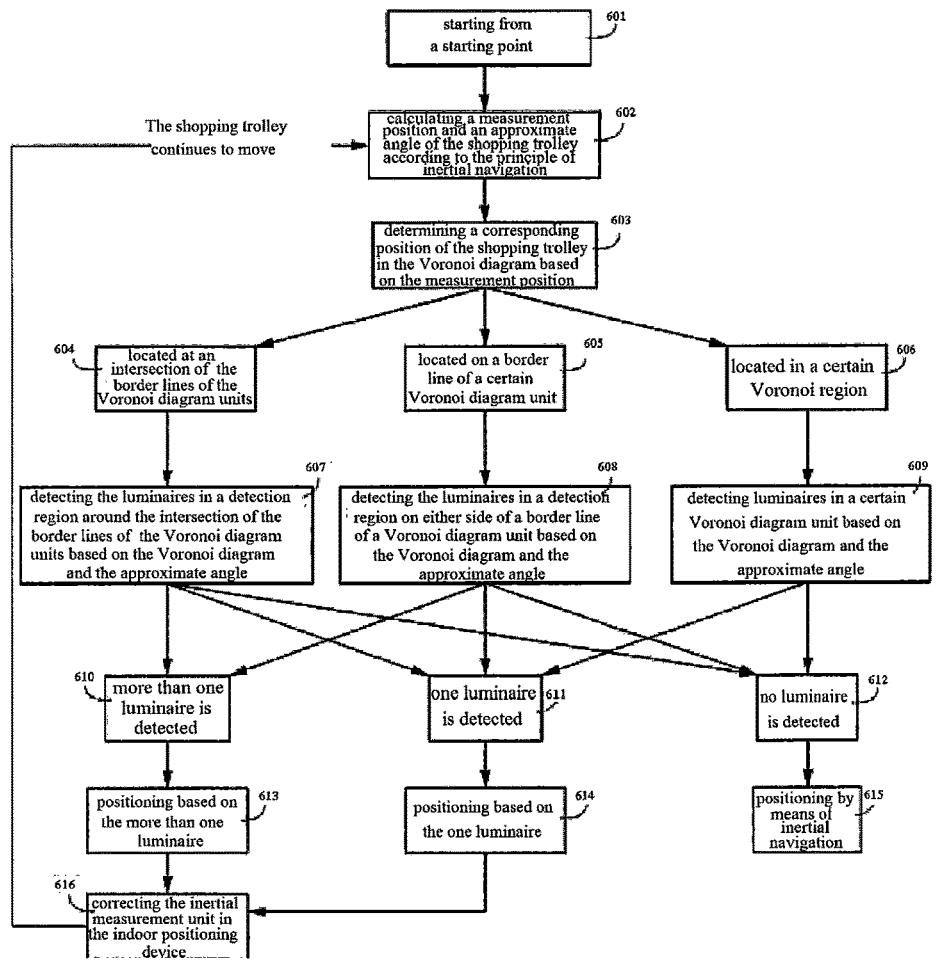
FIG. 6 shows a process of positioning a shopping trolley in an indoor space according to an embodiment of this disclosure.

As shown in FIG. 6, in step 601, starting from a known starting point, recording by the shopping trolley an initial position of its own and an initial angle with respect to the x-axis or y-axis on the horizontal plane of the reference coordinate system, and meanwhile beginning to record measurement results of the inertial measurement unit during the movement of the shopping trolley. In step 602, based on the measurement results of the inertial measurement unit, calculating a measurement position of the shopping trolley and an approximate angle according to the principle of inertial navigation, and the approximate angle herein has the same meaning as the rotation angle mentioned above. In step 603, based on a map of the indoor space and information of a luminaire Voronoi diagram, determining a corresponding position of the shopping trolley in the luminaire Voronoi diagram. If the shopping trolley is determined to be located at an intersection of the border lines of the Voronoi diagram units in step 604, calculating in step 607 measurement positions of generators (i.e., projections of the central points of the light-emitting portions of the luminaires on the horizontal plane) of all Voronoi diagram units in the vicinity of the intersection of the border lines of the Voronoi diagram units where the shopping trolley is located in the image captured by the imaging unit based on the information of the luminaire Voronoi diagram, coordinates of the central points of the light-emitting portions of all luminaires in the reference coordinate system and the approximate angle measured by the inertial measurement unit, and detecting light-emitting portions of the luminaires in a detection region around the measurement positions. If in step 610 light emitting portions of more than one luminaire are detected in the detection region defined in step 607, using the more than one luminaires as reference luminaires, according to the calculation principle discussed with reference to FIG. 2, calculating the position of the shopping trolley in the indoor space in step 613. If the measurement position of the shopping trolley is determined to correspond to a border line of a certain Voronoi unit of the luminaire Voronoi diagram in step 605, like in step 607, calculating in step 608 measurement positions of generators of all Voronoi diagram units in the vicinity of the point of the Voronoi diagram border line at which the shopping trolley is located in the image captured by the imaging unit, and detecting light-emitting portions of the luminaires in a detection region around the measurement positions. If in step 611 a light emitting portion of one luminaire is detected in the detection region defined in step 608, using the detected one luminaire as a reference luminaire, calculating the position of the shopping trolley in the indoor space in step 614 according to the calculation principle described in the embodiment corresponding to FIG. 2. If the measurement position of the shopping trolley is determined to be located within a region of a certain Voronoi diagram unit in step 606, calculating measurement position of a generator of the Voronoi diagram unit in which the shopping trolley is located in the image captured by the imaging unit, and detecting light-emitting portions of the luminaires around the measurement position. If in step 612 no luminaire is detected, using an inertial measurement unit for navigation positioning. As mentioned above, in a case in which a plurality of luminaires are used as reference luminaires, a plurality of angle values for the rotation angle can be reversely calculated respectively based on the calculated plurality of positions of the imaging unit in the reference coordinate system, and the rotation angle obtained based on the inertial measurement unit can be replaced with an average of the plurality of angle values. Therefore, in step 616, the inertial measurement unit can be corrected based on the position of the shopping trolley in the indoor space obtained in steps 613 or 614 and the average of the plurality of angle values.

Determining the position of the shopping trolley in the Voronoi diagram based on the measurement position of the shopping trolley may be specifically implemented by the following example method. A circle can be drawn in the luminaire Voronoi diagram, with the measurement position of the shopping trolley as a center of the circle and R as radius. The radius R can be determined based on the accuracy of the inertial measurement unit, for example, a measurement standard error of the inertial measurement unit can be chosen as R. An intersection of the border lines of the Voronoi diagram units is first sought in the circle area, and if more than one intersection is detected, the one closest to the measurement position will be selected. If no intersection of border lines of the Voronoi diagram is detected, the border lines between the Voronoi diagram units will be detected in the circle area, and if more than one border line is detected, the one closest to the measurement position will be selected. If no border line is detected, it is determined that the measurement position falls within the region of a Voronoi diagram unit.

Figure 7:
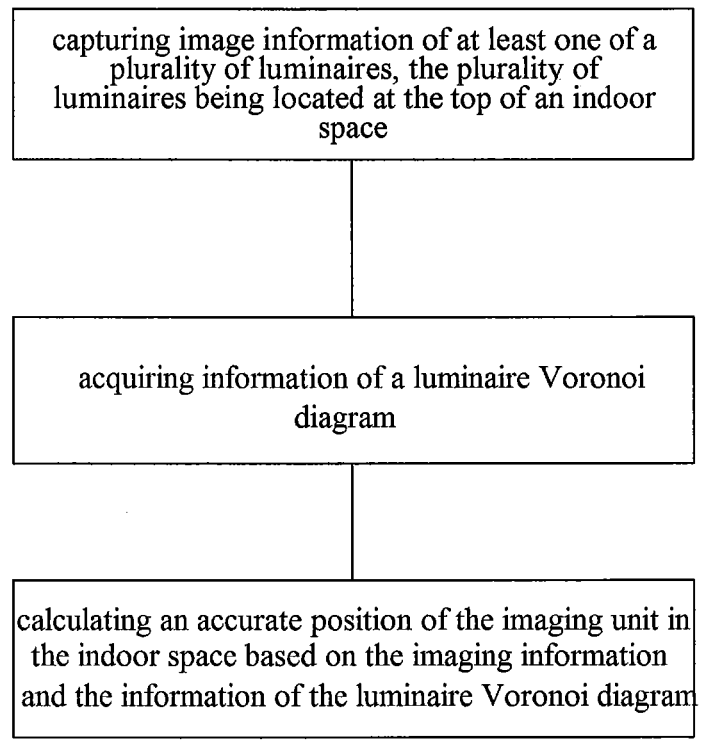
FIG. 7 shows a basic flow of a method for positioning a movable device in an indoor space according to an embodiment of this disclosure.

Another embodiment of this disclosure provides a method for positioning a movable device in an indoor space, the movable device comprising an imaging unit. As shown in FIG. 7, the method comprises: capturing, by the imaging unit, image information of at least one of a plurality of luminaires, the plurality of luminaires being located at the top of the indoor space; acquiring information of a luminaire Voronoi diagram, the luminaire Voronoi diagram comprising a plurality of Voronoi diagram units corresponding to a plurality of generators respectively, the plurality of generators comprising projections of the central points of the light-emitting portions of the plurality of luminaires on a horizontal plane; calculating a position of the imaging unit in the indoor space based on the image information and the information of the luminaire Voronoi diagram.

In some embodiments, the method for positioning a movable device in an indoor space further comprises: acquiring a measurement position and a rotation angle of the imaging unit in the horizontal plane of the indoor space, the rotation angle being an angle at which the imaging unit rotates relative to an initial state around an optical axis of the imaging unit in the horizontal plane; determining a position of the imaging unit in the luminaire Voronoi diagram according to the measurement position; selecting a reference luminaire according to the position of the imaging unit in the luminaire Voronoi diagram, and calculating a position of the imaging unit in the indoor space based on information parameters of the reference luminaire and the rotation angle. The information parameters of the reference luminaire comprise a reference coordinate position of the central point of the light-emitting portion of the reference luminaire in the reference coordinate system and a projection vector of a reference position vector of the reference luminaire on the horizontal plane. The starting point of the reference position vector is the imaging unit and the end point thereof is the central point of the light-emitting portion of the reference luminaire, and the reference coordinate system is defined based on the horizontal plane of the indoor space and has a fixed origin.

In some embodiments, the method for positioning comprises: in response to the measurement position of the imaging unit being located in a first Voronoi diagram unit of the luminaire Voronoi diagram, choosing a first luminaire corresponding to the first Voronoi diagram unit as a reference luminaire, the information parameters of the reference luminaire comprising a first coordinate position of the central point of the light-emitting portion of the first luminaire in the reference coordinate system and a first projection vector of a first position vector of the first luminaire on the horizontal plane, the starting point of the first position vector is the imaging unit and the end point thereof is the central point of the light-emitting portion of the first luminaire In some embodiments, the method for positioning comprises: in response to the measurement position of the imaging unit being located on a junction between a first Voronoi diagram unit and a second Voronoi diagram unit of the luminaire Voronoi diagram, choosing a first luminaire corresponding to the first Voronoi diagram unit and a second luminaire corresponding to the second Voronoi diagram unit as reference luminaires; calculating a first position and a second position of the imaging unit in the reference coordinate system respectively based on information parameters of the first luminaire, information parameters of the second luminaire and the rotation angle, and calculating an average of the first position and the second position as a position of the imaging unit in the indoor space.

In some embodiments, the method for positioning comprises: in response to the measurement position of the imaging unit being located at an intersection of a first Voronoi diagram unit, a second Voronoi diagram unit and a third Voronoi diagram unit of the luminaire Voronoi diagram, choosing a first luminaire corresponding to the first Voronoi diagram unit, a second luminaire corresponding to the second Voronoi diagram unit and a third luminaire corresponding to the third Voronoi diagram unit as reference luminaires, calculating a first position, a second position and a third position of the imaging unit in the reference coordinate system respectively based on information parameters of the first luminaire, information parameters of the second luminaire, information parameters of the third luminaire and the rotation angle, and calculating an average of the first position, the second position and the third position as a position of the imaging unit in the indoor space.

In some embodiments, the method for positioning comprises receiving information of an updated luminaire Voronoi diagram, the information of the updated luminaire Voronoi diagram reflecting supplement, failure and absence of luminaires at the top of the indoor space.

In some embodiments of this disclosure, the luminaire Voronoi diagram is a weighted Voronoi diagram, and a difference between a vertical distance from the central point of the light-emitting portion of the luminaire to the ground of the indoor space and a vertical distance from the imaging unit to the ground of the indoor space serves as a weight for the weighted Voronoi diagram.

In some embodiments, the method for positioning comprises: reversely calculating a first value and a second value for the rotation angle respectively based on the calculated first position and second position, and replacing the rotation angle obtained based on the inertial measurement unit with an average of the first value and the second value.

In some embodiments, the method for positioning comprises: reversely calculating a first value, a second value and a third value for the rotation angle respectively based on the calculated first position, second position and third position, and replacing the rotation angle obtained based on the inertial measurement unit with an average of the first value, the second value and the third value.

In some embodiments, the method for positioning comprises: in response to the imaging unit failing to capture image information of any luminaires, using the measurement position as a position of the imaging unit in the indoor space.

Still another embodiment of this disclosure provides a computer readable medium on which a program is stored, the program being configured to execute the positioning method according to any of the above embodiments of a method for positioning a movable device in an indoor space when running on a computer or a processor. The computer readable medium is for example a volatile and non-volatile computer memory, such as RAM, PROM, EPROM and EEPROM. The medium is encoded with one or more programs, which execute required functions when running on one or more processors and/or controllers. The computer readable medium can be fixed or transplanted in a processor or a controller such that the one or more program stored thereon can be uploaded into the processor or the controller.

When carrying out the solutions disclosed herein, those skilled in the art can understand and achieve other variations of the disclosed embodiments by studying the drawings, the description and the appended claims. In the claims, the wording such as "include" or "comprise" do not exclude the presence of other elements or steps, and the indefinite article "one" or "a" does not exclude a plurality. The mere fact that certain measures are recited in mutually different dependent claims does not indicate that a combination of these measures cannot be used to advantage.

The invention claimed is:

1. An indoor positioning device, comprising:
    an imaging unit configured to capture image information of at least one of a plurality of luminaires, wherein the plurality of luminaires are at a top of an indoor space;
    a memory configured to store information of a luminaire Voronoi diagram, wherein the luminaire Voronoi diagram comprises a plurality of Voronoi diagram units, wherein each Voronoi diagram unit of the plurality of Voronoi diagram units comprises a generator, and wherein the generator of each Voronoi diagram unit of the plurality of Voronoi diagram units is in a projection of a respective luminaire of the plurality of luminaires on a horizontal plane of the indoor space; and
    a processor configured to receive the image information and the information of the luminaire Voronoi diagram, and calculate a position of the imaging unit in the indoor space based on the image information and the information of the luminaire Voronoi diagram.

2. The indoor positioning device according to claim 1, wherein the imaging unit comprises a camera, and wherein the camera is configured such that an optical axis of the camera is perpendicular to the horizontal plane of the indoor space when the image information of the luminaires is being captured.

3. The indoor positioning device according to claim 2, wherein the image information comprises image information of N luminaires,
    wherein the processor is configured to calculate reference coordinates of the imaging unit in a reference coordinate system based on information parameters of M luminaires among the N luminaires and a coordinate system angle, thereby obtaining M reference coordinates,
    wherein the processor is further configured to calculate an average of the M reference coordinates as the position of the imaging unit in the indoor space,
    wherein the reference coordinate system is defined based on the horizontal plane of the indoor space and has a fixed origin,
    wherein the coordinate system angle is an angle enclosed between an x- or y-axis of the reference coordinate system and an x-axis of an imaging unit coordinate system, and
    wherein an origin of the imaging unit coordinate system is in the imaging unit, and a plane defined by the x-axis and a y-axis of the imaging unit coordinate system is parallel with the horizontal plane,
    wherein the information parameters of each luminaire of the M luminaires comprise a coordinate position of the luminaire in the reference coordinate system and a projection vector of a position vector of the luminaire on the horizontal plane,
    wherein a starting point of the position vector is the camera and an end point of the position vector is the luminaire, and
    wherein M and N are both integers greater than or equal to 1, and M is smaller than or equal to N.

4. The indoor positioning device according to claim 2, wherein the indoor positioning device further comprises:
    an inertial measurement unit,
    wherein the inertial measurement unit is configured to acquire a measurement position and a rotation angle of the imaging unit in the horizontal plane of the indoor space,
    wherein the rotation angle is an angle at which the imaging unit rotates relative to an initial state around the optical axis in the horizontal plane.

5. The indoor positioning device according to claim 4, wherein the processor is configured to determine a position of the imaging unit in the luminaire Voronoi diagram according to the measurement position of the imaging unit, and select a reference luminaire according to the position of the imaging unit in the luminaire Voronoi diagram,
    wherein the processor is further configured to calculate coordinates of the imaging unit in a reference coordinate system as the position of the imaging unit in the indoor space based on information parameters of the reference luminaire and the rotation angle,
    wherein the reference coordinate system is defined based on the horizontal plane of the indoor space and has a fixed origin,
    wherein the information parameters of the reference luminaire comprise a coordinate position of the reference luminaire in the reference coordinate system and a projection vector of a reference position vector of the reference luminaire on the horizontal plane, and wherein a starting point of the reference position vector is the camera and an end point of the reference position vector is the reference luminaire.

6. The indoor positioning device according to claim 5, wherein the processor is configured to choose, in response to the measurement position of the imaging unit being in a first Voronoi diagram unit of the luminaire Voronoi diagram, a first luminaire corresponding to the first Voronoi diagram unit as the reference luminaire,
wherein the information parameters of the reference luminaire comprise a first coordinate position of the first luminaire in the reference coordinate system and a first projection vector of a first position vector of the first luminaire on the horizontal plane, and
wherein a starting point of the first position vector is the camera and an end point of the first position vector is the first luminaire.

7. The indoor positioning device according to claim 5, wherein the processor is configured to choose, in response to the measurement position of the imaging unit being on a junction between a first Voronoi diagram unit and a second Voronoi diagram unit of the luminaire Voronoi diagram, a first luminaire corresponding to the first Voronoi diagram unit and a second luminaire corresponding to the second Voronoi diagram unit as reference luminaires, calculate a first position and a second position of the imaging unit in the reference coordinate system respectively based on information parameters of the first luminaire, information parameters of the second luminaire and the rotation angle, and calculate an average of the first position and the second position as the position of the imaging unit in the indoor space.

8. The indoor positioning device according to claim 5, wherein the processor is configured to choose, in response to the measurement position of the imaging unit being at an intersection of a first Voronoi diagram unit, a second Voronoi diagram unit and a third Voronoi diagram unit of the luminaire Voronoi diagram, wherein a first luminaire corresponds to the first Voronoi diagram unit, a second luminaire corresponds to the second Voronoi diagram unit and a third luminaire corresponds to the third Voronoi diagram unit as reference luminaires, calculate a first position, a second position and a third position of the imaging unit in the reference coordinate system respectively based on information parameters of the first luminaire, information parameters of the second luminaire, information parameters of the third luminaire and the rotation angle, and calculate an average of the first position, the second position and the third position as the position of the imaging unit in the indoor space.

9. The indoor positioning device according to claim 2, wherein the indoor positioning device further comprises:
a communication unit configured to receive information of an updated luminaire Voronoi diagram,
wherein the information of the updated luminaire Voronoi diagram reflect supplement, failure and absence of luminaires at the top of the indoor space.

10. The indoor positioning device according to claim 4, wherein the inertial measurement unit comprises an acceleration sensor and a three-axis angular velocity sensor.

11. The indoor positioning device according to claim 1, wherein the luminaire Voronoi diagram comprises a weighted Voronoi diagram, and
wherein a difference between a vertical distance from the luminaires to a ground of the indoor space and a vertical distance from the imaging unit to the ground of the indoor space serves as a weight for the weighted Voronoi diagram.

12. The indoor positioning device according to claim 7, wherein the processor is further configured to calculate a first value and a second value for the rotation angle respectively based on the first position and second position, and replace the rotation angle obtained based on the inertial measurement unit with an average of the first value and the second value.

13. The indoor positioning device according to claim 8, wherein the processor is further configured to calculate a first value, a second value and a third value for the rotation angle respectively based on the first position, second position and third position, and replace the rotation angle obtained based on the inertial measurement unit with an average of the first value, the second value and the third value.

14. The indoor positioning device according to claim 1, wherein the generator of each Voronoi diagram unit of the plurality of Voronoi diagram units comprises a projection of a central point of a light-emitting portion of the respective luminaire of the plurality of luminaires on the horizontal plane of the indoor space.

15. A movable device comprising the indoor positioning device according to claim 1.

16. The movable device according to claim 15, wherein the movable device comprises a shopping trolley.

17. A method for positioning a movable device in an indoor space, the movable device comprising an imaging unit, the method comprising:
capturing, by the imaging unit, image information of at least one of a plurality of luminaires, wherein the plurality of luminaires are at a top of the indoor space;
acquiring information of a luminaire Voronoi diagram, wherein the luminaire Voronoi diagram comprises a plurality of Voronoi diagram units, wherein each Voronoi diagram unit of the plurality of Voronoi diagram units comprise a generator, wherein the generator of each Voronoi diagram unit of the plurality of Voronoi diagram units is in a projection of a respective luminaire of the plurality of luminaires on a horizontal plane; and
calculating a position of the imaging unit in the indoor space based on the image information and the information of the luminaire Voronoi diagram.

18. The method according to claim 17, further comprising:
acquiring, by an inertial measurement unit, a measurement position and a rotation angle of the imaging unit in the horizontal plane of the indoor space, wherein the rotation angle comprises an angle at which the imaging unit rotates relative to an initial state around an optical axis of the imaging unit in the horizontal plane;
determining a position of the imaging unit in the luminaire Voronoi diagram based on the measurement position; and
selecting a reference luminaire according to the position of the imaging unit in the luminaire Voronoi diagram, and calculating the position of the imaging unit in the indoor space based on information parameters of the reference luminaire and the rotation angle,
wherein the information parameters of the reference luminaire comprise a reference coordinate position of the reference luminaire in a reference coordinate system and a projection vector of a reference position vector of the reference luminaire on the horizontal plane, wherein a starting point of the reference position vector is the imaging unit and an end point of the reference position vector is the reference luminaire, and wherein the reference coordinate system is defined based on the horizontal plane of the indoor space and has a fixed origin.

19. The method according to claim 18, further comprising:

in response to the measurement position of the imaging unit being in a first Voronoi diagram unit of the luminaire Voronoi diagram, choosing a first luminaire corresponding to the first Voronoi diagram unit as the reference luminaire, wherein the information parameters of the reference luminaire comprising a first coordinate position of the first luminaire in the reference coordinate system and a first projection vector of a first position vector of the first luminaire on the horizontal plane, and wherein a starting point of the first position vector is the imaging unit and an end point of the first position vector is the first luminaire;

in response to the measurement position of the imaging unit being on a junction between a first Voronoi diagram unit and a second Voronoi diagram unit of the luminaire Voronoi diagram, choosing a first luminaire corresponding to the first Voronoi diagram unit and a second luminaire corresponding to the second Voronoi diagram unit as reference luminaires, calculating a first position and a second position of the imaging unit in the reference coordinate system respectively based on information parameters of the first luminaire, information parameters of the second luminaire and the rotation angle, and calculating an average of the first position and the second position as the position of the imaging unit in the indoor space; and in response to the measurement position of the imaging unit being at an intersection of a first Voronoi diagram unit, a second Voronoi diagram unit and a third Voronoi diagram unit of the luminaire Voronoi diagram, choosing a first luminaire corresponding to the first Voronoi diagram unit, a second luminaire corresponding to the second Voronoi diagram unit and a third luminaire corresponding to the third Voronoi diagram unit as reference luminaires, calculating a first position, a second position and a third position of the imaging unit in the reference coordinate system respectively based on information parameters of the first luminaire, information parameters of the second luminaire, information parameters of the third luminaire and the rotation angle, and calculating an average of the first position, the second position and the third position as the position of the imaging unit in the indoor space.

20. A non-transitory computer readable medium on which a program is stored, the program being configured to execute the method according to claim 17 when running on a computer or a processor.

* * * * *